United States Patent
Carlesimo et al.

(10) Patent No.: US 10,023,024 B2
(45) Date of Patent: Jul. 17, 2018

(54) HEATING OR COOLING A VEHICLE

(71) Applicant: GM GLOBAL TECHNOLOGY OPERATIONS LLC, Detroit, MI (US)

(72) Inventors: Daniel P. Carlesimo, Macomb Township, MI (US); Marcelo V. Lazarini, Macomb Township, MI (US); Rafael Navarenho de Souza, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 15/151,205

(22) Filed: May 10, 2016

(65) Prior Publication Data

US 2017/0326944 A1    Nov. 16, 2017

(51) Int. Cl.
*G06F 7/00* (2006.01)
*B60H 1/00* (2006.01)

(52) U.S. Cl.
CPC ..... *B60H 1/00657* (2013.01); *B60H 1/00778* (2013.01); *B60H 1/00878* (2013.01); *B60H 1/00985* (2013.01)

(58) Field of Classification Search
CPC ............ B60H 1/00657; B60H 1/00985; B60H 1/00778; B60H 1/00878
See application file for complete search history.

(56) References Cited

U.S. PATENT DOCUMENTS

| | | | |
|---|---|---|---|
| 7,650,864 B2 * | 1/2010 | Hassan | B60R 25/045 123/179.2 |
| 8,096,482 B2 * | 1/2012 | Dage | B60H 1/00657 123/179.2 |
| 8,751,065 B1 * | 6/2014 | Kato | H04M 1/72533 340/426.13 |
| 9,403,417 B2 * | 8/2016 | Proefke | B60H 1/00642 |
| 2015/0126176 A1 * | 5/2015 | Hernandez | H04W 12/08 455/420 |

* cited by examiner

*Primary Examiner* — Ian Jen
(74) *Attorney, Agent, or Firm* — David Willoughby; Reising Ethington P.C.

(57) ABSTRACT

In an example of a method for heating or cooling a vehicle, an application resident on an electronic memory of a mobile communications device is launched. The electronic memory is coupled to a microprocessor. The microprocessor is operatively connected to a mobile device communications platform (MDCP). Preset climate control modes are displayed on a display. A user input identifying a selected preset climate control mode is received at a user interface. In response to receiving the user input, the selected preset climate control mode is transmitted to a vehicle communications platform (VCP). In response to receiving the selected preset climate control mode, a climate control instruction is transmitted by the VCP to a climate control system. In response to receiving the climate control instruction at the control module of the climate control system, the selected preset climate control mode is caused to be implemented in the vehicle.

21 Claims, 3 Drawing Sheets

Fig-3

HEATING OR COOLING A VEHICLE

TECHNICAL FIELD

The present disclosure relates generally to vehicle heating or cooling methods.

BACKGROUND

Vehicles are often equipped with climate control systems that heat and/or cool the interior and/or exterior of the vehicle. Climate control systems may control the cabin air temperature, the seat temperature, the outside rear view mirror temperature, the rear window temperature, and the steering wheel temperature.

SUMMARY

In an example of a method for heating or cooling a vehicle, an application resident on an electronic memory of a mobile communications device is launched. The electronic memory of the mobile communication device is coupled to a microprocessor of the mobile communications device, and the microprocessor is operatively connected to a mobile device communications platform (MDCP). Preset climate control modes are displayed on a display of the mobile communications device. A user input identifying a selected preset climate control mode is received at a user interface of the mobile communications device. In response to receiving the user input, the selected preset climate control mode is transmitted by the MDCP to a vehicle communications platform (VCP) of the vehicle. In response to receiving the selected preset climate control mode at the VCP, a climate control instruction is transmitted by the VCP to a climate control system of the vehicle, the climate control system having a control module in communication with the VCP. In response to receiving the climate control instruction at the control module of the climate control system, the selected preset climate control mode is caused to be implemented in the vehicle.

An example of a system for heating or cooling a vehicle includes an application resident on an electronic memory of a mobile communications device, where the electronic memory of the mobile communication device is coupled to a microprocessor of the mobile communications device, and the microprocessor of the mobile communications device is operatively connected to a mobile device communications platform. The system further includes a vehicle communications platform (VCP) operatively disposed in the vehicle, and a climate control system having a control module in communication with the VCP. The application is for displaying preset climate control modes, receiving a user input identifying a selected preset climate control mode, and transmitting, by using the mobile device communications platform, the selected preset climate control mode to the VCP of the vehicle. The VCP is for receiving the selected preset climate control mode and transmitting a climate control instruction to the climate control system of the vehicle. The control module of the climate control system is for receiving the climate control instruction and causing the selected preset climate control mode to be implemented in the vehicle.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method and system disclosed herein utilize an application containing preset climate control modes to initiate heating or cooling of a vehicle remotely (e.g., during a remote start event). The modes contain bundled settings, conditions, etc. that are implemented when a user selects a particular mode from the application. As such, the modes improve the function of the vehicle by enabling the vehicle to simultaneously implement several settings and/or conditions in response to a single command. Additionally, the modes enable the user to quickly select a single option for controlling several in-vehicle settings and/ or conditions (e.g., the temperature inside of the vehicle and/or the level of visibility through the windows of the vehicle). The various modes are preset in order to accommodate typical user preferences and/or comfort levels and to maximize, if possible, the vehicle's energy efficiency. For example, the user may select an economy mode that provides a minimum level of comfort regarding the vehicle's interior temperature in order to improve the vehicle's energy efficiency while performing the remote start. The user may prefer energy efficiency over the level of comfort to save on fuel costs or battery power consumption, or to have less of an impact on the environment. In another example, a user may select a high performance mode that provides a maximum level of comfort regarding the vehicle's interior temperature and window visibility. The user may prefer the maximum comfort level and window visibility when the temperature is abnormally cold or snowy.

The user may launch the application on a mobile communications device. The application displays, using the display of the mobile communications device, the preset climate control modes. The user selects the preset climate control mode he/she would like implemented in the vehicle by entering a user input at the user interface of the mobile communications device. The mobile device communications platform (MDCP) transmits the selected preset climate control mode to the vehicle communications platform (VCP). The VCP then transmits a climate control instruction to a control module of a climate control system of the vehicle, and the control module causes the selected preset climate control mode to be implemented in the vehicle.

Figure 1:
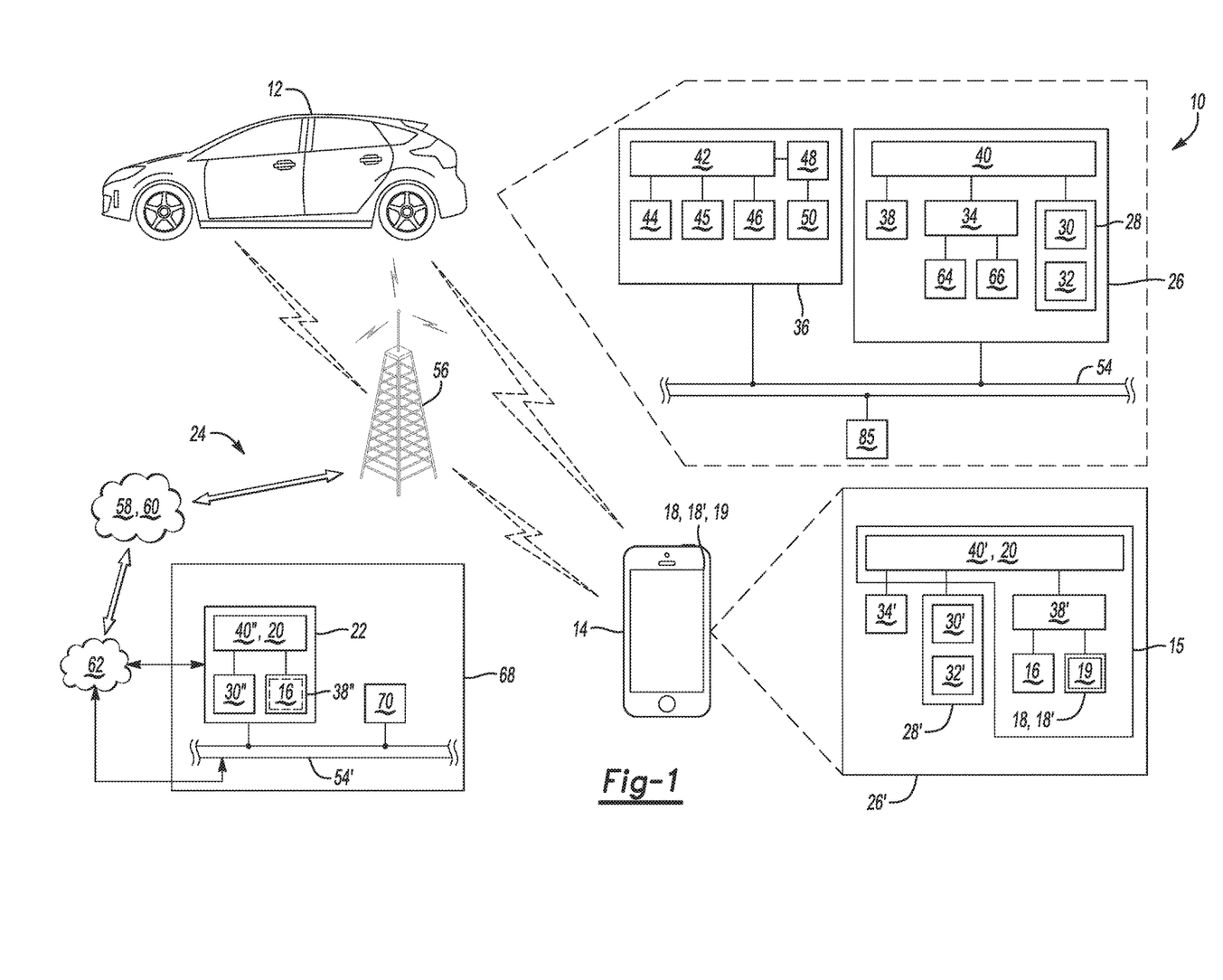
FIG. 1 is a schematic view of an example of a system for heating or cooling a vehicle.

Referring now to FIG. 1, an example of the system 10 is depicted. The system 10 includes a vehicle 12 and a mobile communications device 14. The system 10 may also include a server 22 (which may be part of a center 68 that provides back-end services to the vehicle 12). In the example shown in FIG. 1, each component 12, 14, 22 is capable of communicating with one or more of the other components 12, 14, 22 using low energy, short range wireless communication technology, dedicated short range communications technology, and/or a wireless carrier/communication system 24.

In some examples disclosed herein, a vehicle heating or cooling application 15 follows a model/view/controller design pattern. The model 16 contains the specific data (e.g., a list of preset climate control modes and the distinct heating or cooling procedure associated with each) and business logic for the application 15. The view 18' is an interface (e.g., user interface 18) on the mobile communications device 14 that allows a user to view the data and to enter a user input to identify a selected preset climate control mode 72 (shown in FIG. 3). The controller 20 performs operations on the data. The view 18' visually provides data, information, options, etc. to the user of the mobile communications device 14, and also enables the user to interact with the application 15 using swipes, gestures, taps, touches, tables, etc. The controller 20 is between the model 16 and the view 18', and acts as a dispatcher between two. More specifically, the controller 20 provides model data to the view 18', and interprets user actions (received at the view 18'), such as a user input identifying a selected preset climate control mode 72. The controller 20 depends on the view 18' and the model 16. The view 18' is part of the mobile communications device 14 and, in some examples, is the user interface 18 of the mobile communications device 14.

In some examples disclosed herein, the model 16 and controller 20 may be on an external computing device (not shown). As one example, the computing device may be hosted on the server 22. When the computing device is hosted on a device external to the mobile communications device 14, the hosting device (e.g., server 22) may act as a server, and the mobile communications device 14 may act as a thin client. In some instances, in addition to having access to the data contained in the model 16, the hosting device may also be in communication with a back-end system (e.g., components at center 68) to obtain additional data (e.g., weather alerts 92, driving advisories 94, etc., shown in FIG. 3) that is not contained in the model 16.

In other instances, the mobile communications device 14 may contain the view 18', controller 20, and model 16. In these instances, the mobile communications device 14 is capable of storing the data, providing the interface, and performing operations on the data. In these instances, the selected preset climate control mode 72 (shown in FIG. 3) may be transmitted directly to the vehicle 12 from the mobile communications device 14, which functions in the same manner as the external computing device described herein. In these instances then, the server 22 is not part of the system 10.

In some of the examples disclosed herein, data (e.g., selected preset climate control mode(s) 72 or user input data 76 (shown in FIG. 3), etc.) may be transmitted to, from, and/or between communication component(s) of the vehicle 12, the mobile communications device 14, and/or the server 22 using the carrier/communication system 24. Some of these communication links between the various components are shown as lightning bolts and arrows in FIG. 1.

In an example, the carrier/communication system 24 is a two-way radio frequency (RF) communication system. The carrier/communication system 24 may include one or more cell towers 56 or satellites (not shown). It is to be understood that the carrier/communication system 24 may also include one or more base stations and/or mobile switching centers (MSCs) 58 (e.g., for a 2G/3G network), one or more evolved Node Bs (eNodeB) and evolved packet cores (EPC) 60 (for a 4G (long-term evolution, LTE) network), and/or one or more land networks 62. The carrier/communication system 24 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 24 may be GSM (global system for mobile telecommunications), CDMA2000, UMTS (universal mobile telecommunications system), LTE, or some other available architecture.

Short range wireless communications, such as low energy short range wireless communications, may be suitable for communication between, for example, the vehicle 12 and the mobile communications device 14. Each of the vehicle 12 and the mobile communications device 14 includes a respective communications platform, referred to herein as the vehicle communications platform (VCP) 26, and the mobile device communications platform (MDCP) 26'.

The vehicle communications platform 26 may be in low energy, short range wireless communication with the mobile device communications platform 26'. The communications platforms 26, 26' may communicate via any low energy, short range wireless communication technology. Low energy, short-range wireless communication technology refers to a wireless personal area network technology that provides reduced power consumption while maintaining a better or similar communication range (e.g., 100 meters or less) when compared to other short-range wireless technology standards. An example of the low energy, short-range wireless communication technology is BLUETOOTH® low energy (i.e., BLUETOOTH® LE (BLE) or BLUETOOTH® Smart). BLUETOOTH® low energy enabled devices consume a fraction of the power of conventional BLUETOOTH® enabled devices, while maintaining a better or similar communication range.

Each of the communications platforms 26, 26' is equipped with a low energy, short-range wireless communication module 28, 28'. In one example, each of the low energy, short-range wireless communication modules 28, 28' is a BLE module. Each of these modules 28, 28' includes a respective transceiver 30, 30' (or a transmitter and a receiver) and a respective node 32, 32'. Each transceiver 30, 30' includes a respective signal emitter for transmitting signals/data and a respective signal receiver for receiving signals/data. The respective nodes 32, 32' allow the modules 28, 28' to communicate, via a short-range wireless communication link, with other device(s) that are low energy, short-range wireless communication enabled. The node 32, 32' provides the autonomous communication link with the other enabled device(s) after an initial pairing between the two modules 28, 28'. The nodes 32, 32' may be standalone chipsets/modems, or may be integrated as part of the transceiver 30, 30', or may be integrated as part of any other circuit in the module 28, 28'.

It is to be understood that each of the modules 28, 28' has a unique identifying code (e.g., a wireless connection key) that is used to pair the respective module 28, 28' of another enabled device. Two devices are paired with each other when the modules 28, 28' of those devices exchange their unique identifying codes with each other. For example, the module 28 in the vehicle 12 and the module 28' in the mobile communications device 14 are paired when they exchange their unique identifying codes with each other. This enables the vehicle 12 and the mobile communications device 14 to communicate typically under a secured connection (e.g., autonomous communication link).

As a more specific example, initial pairing may involve setting the mobile communications device 14 to a short range wireless discovery mode (such as by selecting, on the mobile communications device 14, a discovery mode function as a menu option, icon, or the like). While in the discovery mode, other devices configured for low energy, short-range wireless communications (such as the vehicle 12 including module 28) are allowed to detect the presence of the mobile communications device 14. When the module 28 locates the mobile communications device 14, the mobile communications device 14 automatically provides the type of device it is (e.g., a smart phone, a smart watch, a smart bracelet, etc.) and its short range wireless connection name. The mobile communications device 14 may then prompt the user to enter a security code/password, and then the unique identifying code of the mobile communications device 14 is sent to the module 28 of the vehicle 12. Upon receiving the unique identifying code, the module 28 sends its own unique identifying code to the module 28' of the mobile communications device 14 to ultimately pair the two devices 12, 14. After the initial pairing process, the respective devices 12, 14 may automatically establish the communication link without having to go through the initial pairing process again, as long as the devices 12, 14 are within short range of one another.

While low energy, short range wireless communication is described herein as one example, it is to be understood that the communications platforms 26, 26' may alternatively or also be equipped with other short-range wireless communication technology. Examples of other short-range wireless communication technologies includes standard BLUETOOTH® and various classes thereof, dedicated short-range communications (DSRC), or WI-FI™ and various classes thereof.

An Internet connection may also be utilized for the transmission of selected preset climate control mode(s) 72, user input data 76, etc. The communications platforms 26, 26' may communicate via dedicated short range communications (DSRC) or WI-FI™. The transmission of selected preset climate control mode(s) 72, user input data 76, etc. may be made using the carrier/communication system 24, either through the vehicle's Internet connection (e.g., when the vehicle 12 is equipped with a 4G long-term evolution, LTE, or other suitable Internet connection) or through the mobile communication device's cellular and Internet connection. When WI-FI™, dedicated short range communications, and various classes thereof are utilized, the communications platforms 26, 26' may also utilize a cellular adapter (e.g., shown as 34 in the VCP 26 and 34' in the MDCP 26').

Each of the vehicle 12 and the mobile communications device 14 includes several other components. The vehicle 12 will now be described separately from the mobile communications device 14.

In the examples disclosed herein, the vehicle 12 may be a car, motorcycle, truck, or recreational vehicle (RV). The vehicle 12 is equipped with suitable hardware and computer readable instructions/code that allow it to communicate (e.g., transmit and/or receive voice and data communications) over the carrier/communication system 24 and/or the low energy, short-range wireless communication module 28, and/or another communication system.

At least some of the hardware and computer readable instructions/code are embodied in the VCP 26. In an example, the VCP 26 is an on-board vehicle dedicated communications and entertainment device. In another example (not shown), the VCP 26 is an on-board vehicle dedicated communications device (e.g., a telematics unit), and the vehicle 12 includes a separate on-board vehicle dedicated entertainment device (e.g., an infotainment unit). Whether integrated into a single unit (e.g., VCP 26) or included as separate units, the on-board vehicle dedicated communications and entertainment device(s) include hardware components that are capable of running computer readable instructions/code, which are embodied on non-transitory, tangible computer readable media.

The VCP 26 may provide a variety of services. One example of these services includes the VCP 26 transmitting a climate control instruction 74 (shown in FIG. 3) to the control module 42 of the climate control system 36. Several other examples of the services may include, but are not limited to: turn-by-turn directions and other navigation-related services provided in conjunction with a location detection unit; airbag deployment notification and other emergency or roadside assistance-related services; and infotainment-related services where music, Web pages, movies, television programs, videogames and/or other content is downloaded by the VCP 26 via a vehicle bus system 54 and an audio bus system (not shown). The listed services are by no means an exhaustive list of all the capabilities of the VCP 26, but are simply an illustration of some of the services that the VCP 26 is capable of offering.

The VCP 26 may be used for vehicle communications. In the examples disclosed herein, the VCP 26 may communicate with the mobile communications device 14 or the server 22 in order to receive a selected preset climate control mode 72. These, as well as some other, vehicle communications utilize radio or satellite transmissions to establish a voice channel with the carrier/communication system 24 such that both voice and data transmissions may be sent and received over the voice channel. In some instances, vehicle communications are enabled through the VCP 26 via the cellular adapter 34, which includes a cellular chipset/component 64 for voice communications and a data transmission system 66 for data transmission.

The cellular chipset/component 64 of the VCP 26 may be an analog, digital, dual-mode, dual-band, multi-mode and/or multi-band wireless transceiver. The cellular chipset/component 64 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 66 may include a packet builder, which is programmed to make decisions about what packet to send (e.g., bandwidth, data to include, etc.) and to actually build a packet data message. In another example, the data transmission system 66 may include a wireless modem, which applies some type of encoding or modulation to convert the digital data so that it can communicate through a vocoder or speech codec incorporated in the cellular chipset/component 64. It is to be understood that any suitable encoding or modulation technique that provides an acceptable data rate and bit error may be used with the examples disclosed herein. While examples have been provided, it is to be understood that any suitable data transmission system 66 may be used.

The cellular adapter 34 of the vehicle 12 may also provide a portable hotspot, which taps into the cellular network (e.g., a 4G network) and then wirelessly shares its data connection with another short-range wireless communication enabled (e.g., Wi-Fi enabled) device.

The VCP 26 also includes an electronic processing device 40 operatively coupled to one or more types of electronic memory 38. In an example, the electronic processing device 40 is a microprocessor. In other examples, the electronic processing device 40 may be a micro controller, a controller, and/or a host processor (e.g., for the computing device). In another example, electronic processing device 40 may be an application specific integrated circuit (ASIC). The electronic memory 38 of the VCP 26 may be an encrypted memory that is configured to store i) computer readable instructions/code to be executed by the processor 40, ii) data associated with the various systems of the vehicle 12 (i.e., vehicle data, VIN, etc.), and/or the like. The electronic memory 38 may be a non-transitory, tangible computer readable media (e.g., RAM).

The VCP 26 is operatively connected to the vehicle bus system 54. The vehicle bus system 54 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 54 enables the vehicle 12 to send signals (e.g., real-time bus messages, alert notifications) from the VCP 26 to various units of equipment and systems (e.g., the control module 42 of the climate control system 36). The vehicle bus system 54 also enables the vehicle 12 to receive signals at the VCP 26 from various units of equipment and systems. An example of a signal transmitted by the vehicle bus 54 includes a climate control instruction 74 from the VCP 26 to the control module 42 of the climate control system 36.

As illustrated in FIG. 1, the vehicle 12 may also include other systems that are directly or indirectly connected to the bus system 54. Examples of these other systems include a remote start system 35 and a climate control system 36.

The remote start system 35 may be used to start appropriate vehicle systems in response to an initiation of a remote start request received from the application 15. The VCP 26 may receive a signal in response to a user selection (made through the application 15) to remotely start the vehicle 12. The user selection to remotely start the vehicle 12 may be the selection of one of the preset climate control modes 72. In this example, the VCP 26 may instruct the remote start system 35 to turn on the ignition or power up the vehicle's battery and start the climate control system 36.

The climate control system 36 may be used to implement the selected preset climate control mode 72. The selected preset climate control mode 72 may be any of the preset climate control modes displayed by the view 18' of the mobile communications device 14.

Each preset climate control mode 72 is a pre-packaged set of vehicle settings, conditions, etc. that are bundled together as a single option for the user of the application 15. Each mode 72 may be associated with a particular intent, which is to achieve a particular vehicle climate and/or vehicle condition, in some instances, in an energy efficient manner. The modes 72 may be originally configured and reconfigured by an original equipment manufacturer (OEM) of the vehicle 12. The OEM may be best suited to determine which variable(s), setting, and/or variant(s) should be controlled in order to meet the objective or intent of a particular climate control mode 72 while also taking into account vehicle energy efficiency.

The mode 72 may be presented to the user (as displayed by the view 18') in a manner (through word(s) and/or icon(s)) that informs the user of the mode's intent. As examples, the mode 72 may be presented as an economy heat or cool mode (providing minimal in-vehicle comfort level to improve energy efficiency), a high performance heat or cool mode (providing maximum in-vehicle comfort level regardless of energy efficiency), a balanced heat or cool mode (providing a comfortable in-vehicle climate in an energy efficiency manner), or a visibility mode (providing maximum level of window visibility while neglecting or partially neglecting in-vehicle comfort to achieve energy efficiency). The user may or may not be aware of all of the vehicle settings, conditions, etc. that are bundled together in any particular mode 72, but can be made aware of the intent of the mode 72 so that he/she can select a mode 72 suitable for his/her preferences, the weather conditions, etc.

Each mode 72 may be remotely selected by the user through the application 15 and may be implemented in the vehicle 12 through the climate control system 36. When a particular mode 72 is selected, all of the vehicle settings, conditions, etc. associated with the selected mode 72 will be implemented in the vehicle 12, even though the user has selected one mode 72. Therefore, the modes 72 simplify the number of options for the user available in the application, while enabling the user to easily achieve a particular intent or objective.

Each mode 72 includes one or more variables and one or more variants. As used herein, the "variable" is a vehicle component that has a feature that may be remotely controlled, or a vehicle component temperature that may be remotely controlled in order to obtain the desirable vehicle climate and/or vehicle condition. Examples of the variable include cabin air temperature, seat temperature, outside rear view mirror, rear window temperature, steering wheel temperature, and combinations thereof. The preset climate control modes 72 may also include other vehicle variables in addition to or in place of those listed.

The "variant," as used herein, refers to a setting, a zone and/or a position that is associated with the variable.

The setting is either a heating or cooling setting. In the examples disclosed herein, each preset climate control mode 72 includes the heating or cooling setting associated with the variable.

Figure 2:
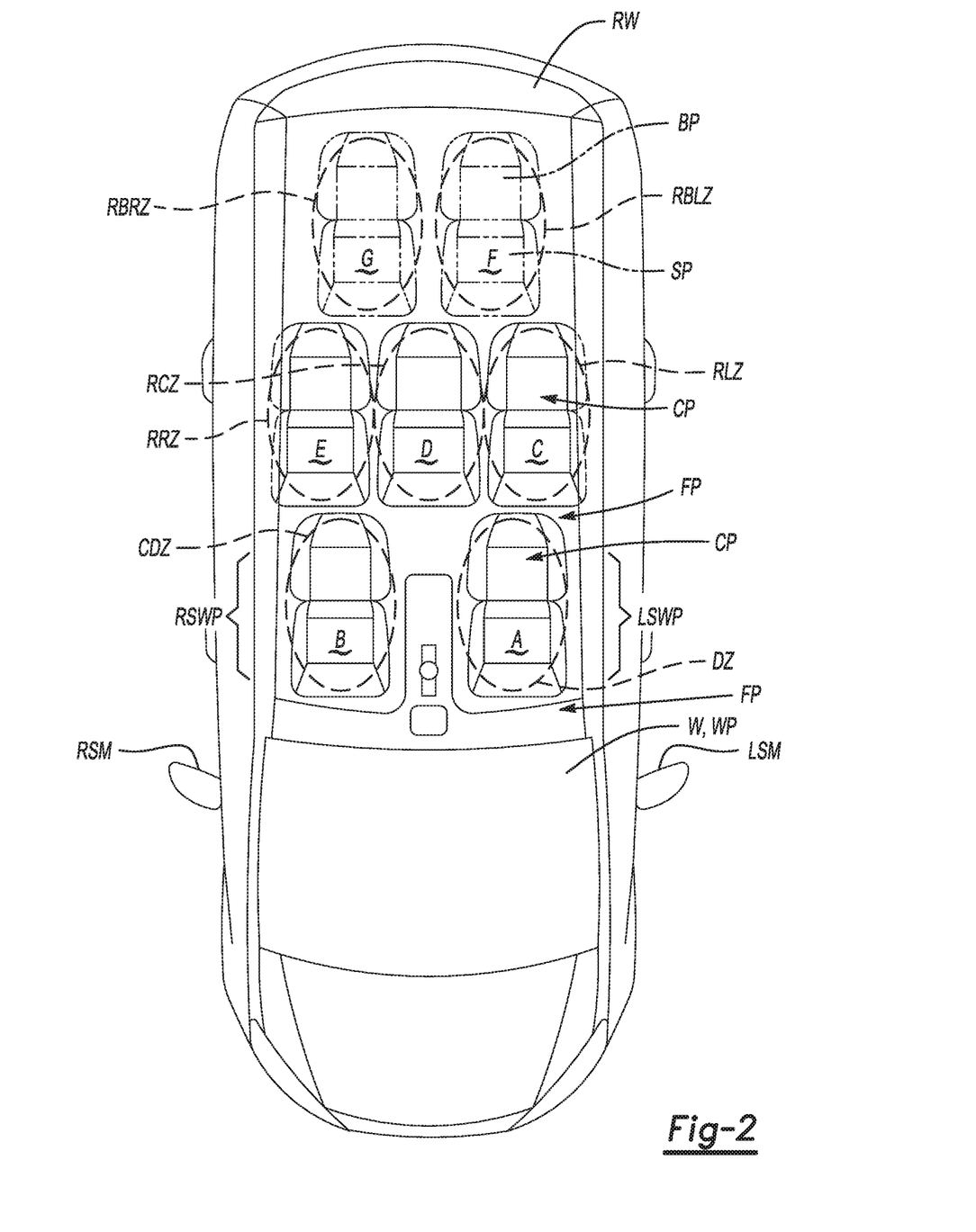
FIG. 2 is a schematic top view of a vehicle and various zones and positions in/on the vehicle that may be part of example preset climate control modes disclosed herein.

The zone is an area of the vehicle 12. As an example, the zones may be configured based on the seating areas in the vehicle 12. FIG. 2 illustrates one example vehicle 12 and several zones that are configured based on the seating areas. For example, in a vehicle 12 having no back seats, the zones may include a driver zone DZ and a co-driver (or front seat passenger) zone CDZ. In a vehicle 12 having two rows of seats, the zones may include the driver zone DZ, the co-driver zone CDZ, a rear left zone RLZ and a rear right zone RRZ. In the example shown in FIG. 2, the zones may also include a rear center zone RCZ because there is a center seat in the second row of seats. In a larger vehicle having at least three rows of seats, the zones may include the driver zone DZ, the co-driver zone CDZ, a rear-middle left zone RLZ, a rear-middle right zone RRZ, a rear-middle center zone RCZ (if there is a center seat in the second row of seats), a rear-back left zone RBLZ, a rear-back right zone RBRZ, and a rear-back center zone (if there is a center seat in the third row of seats, which is not the case in FIG. 2). It is to be understood that generally, as used herein, the rear left zone RLZ, the rear right zone RRZ, and the rear center zone RCZ may refer to the second row of seating (i.e., seats directly behind the driver and co-driver seats) and its surrounding area, a third row of seats (i.e., behind the second row of seats) and its surrounding area, or both the second row and the third row of seats and the surrounding area. The zones based on the seating areas in the vehicle 12 may vary depending upon the number of seats, the seat layout, etc.

In addition to zone(s) that are configured based on vehicle seating areas, the zone may also be a particular vehicle seat (e.g., a driver seat A, a co-driver seat B, a rear (rear-middle and/or rear-back) left seat C, F, a rear (rear-middle and/or rear-back) right seat E, G, a rear (rear-middle and/or rear-back) center seat D, etc.). It is to be understood that generally, as used herein, the rear right seat, the rear left seat, and the rear center seat may refer to seats C, D, E in the second row (i.e., directly behind the driver and co-driver seats A, B), seats G, F in the third row of seating (i.e., behind the second row), or both the second row and the third row of seating.

The zone(s) may also be another area of the vehicle 12, for example, an area that encompasses the vehicle windshield W and the side windows adjacent to the front seat (i.e., a windshield zone) or an indication of where a vehicle component is located, for example, the right side rear view mirror RSM and/or left side rear view mirror LSM (e.g., variable=outside rear view mirror and zone=right side or left side).

Additionally, the zones may vary from mode 72 to mode 72, depending upon the variable(s) of the particular mode 72. When the variable is the cabin air temperature, the seat temperature, the outside rear view mirror, or combinations thereof, the preset climate control mode 72 may further include one or more of the previously listed zones.

The position that may be included in the mode(s) 72 is a particular location within a zone, or a particular vehicle component within or near a zone. The position(s) may vary from mode 72 to mode 72, depending upon the variable(s) of the particular mode 72. In particular, when the variable is the cabin air temperature, the seat temperature, or combinations thereof, the preset climate control mode 72 may further include the position. Examples of the position include a feet position FP, a chest position CP, a windshield position WP, a right side window position RSWP (i.e., window next to the co-driver seat B), a left side window position LSWP (i.e., window next to the driver seat A), a seat position SP, a cushion (or back) position BP, and combinations thereof.

Some examples of the variables, zones, positions that may be associated with the zones, and combinations thereof, that may be part of one or more modes 72, are shown in Table 1 below.

TABLE 1

| Variable | Variant #1 (setting) | Variant #2 (zone) | Variant #3 (position) |
| --- | --- | --- | --- |
| Cabin Air Temperature | Cooling or Heating | Driver Zone | Feet Position, Chest Position |
|  |  | Co-Driver Zone | Feet Position, Chest Position |
|  |  | Rear Left Zone | Feet Position, Chest Position |
|  |  | Rear Right Zone | Feet Position, Chest Position |
|  |  | Rear Center Zone | Feet Position, Chest Position |
|  |  | Windshield Zone | Windshield position (defog) |
|  |  |  | Side Window position (defog) |
| Seat Temperature | Cooling or Heating | Driver Zone | Seat Position, Cushion (Back) Position |
|  |  | Co-Driver Zone | Seat Position, Cushion (Back) Position |

TABLE 1-continued

| Variable | Variant #1 (setting) | Variant #2 (zone) | Variant #3 (position) |
| --- | --- | --- | --- |
|  |  | Rear Left Zone | Seat Position, Cushion (Back) Position |
|  |  | Rear Right Zone | Seat Position, Cushion (Back) Position |
|  |  | Rear Center Zone | Seat Position, Cushion (Back) Position |
| Outside Rear View Mirror Temperature | Heating (defog) | Left side Right side |  |
| Rear Window Temperature | Heating (defog) |  |  |
| Steering Wheel Temperature | Cooling or Heating |  |  |

A preset climate control mode 72 can be created for each possible combination of the variables and the applicable variants shown in Table 1. Furthermore, other variables and variants are also contemplated as being within the purview of this disclosure. Some examples of preset climate control modes 72 include an economy heating mode, an economy cooling mode, a balanced heating mode, a balanced cooling mode, a high performance heating mode, a high performance cooling mode, a visibility/comfort mode, and a visibility only mode.

The economy modes may be configured to provide minimal in-vehicle comfort and to improve vehicle energy efficiency during the remote start. The minimal in-vehicle comfort may be an in-vehicle temperature (i.e., air cabin temperature) that is selected based on the then-current weather conditions (as detected by the application 15). For example, when the then-current weather conditions indicate to the application 15 that the outside temperature is 50° F. or below, the air cabin temperature of the economy mode may be preset to 70° F. For another example, when the then-current weather conditions indicate to the application 15 that the outside temperature is 75° F. or higher, the air cabin temperature of the economy mode may be preset to 65° F. It is to be understood that these temperatures are examples, and that other temperatures may be associated with the economy mode. The improved vehicle energy efficiency may be accomplished by heating and/or cooling minimal zone(s) and position(s) to bring the air cabin temperature to the temperature associated with the economy mode and achieve minimal in-vehicle comfort.

The economy heating mode may include heating the vehicle interior to the particular air cabin temperature by causing the driver zone DZ chest position CP and the driver zone DZ feet position FP to be heated. Heating of this zone DZ and these positions CP, FP may be accomplished by the climate control system 36. The climate control system 36 may include a vehicle heating, ventilating, and air conditioning (HVAC) system 45, which can automatically set a blower mode and fan speed to achieve the particular in-vehicle temperature associated with the economy heating mode. The instrument panel vents on the driver's side of the vehicle 12 may be used to heat the driver zone DZ chest position CP and the floor vents on the driver's side of the vehicle 12 may be used to heat the driver zone DZ feet position FP.

The economy cooling mode may include cooling the vehicle interior to the air cabin temperature by causing the driver zone DZ chest position CP to be cooled. Cooling of this zone DZ and this position CP may be accomplished by the climate control system 36. As with heating, the HVAC system 45 can automatically set a blower mode and fan speed to achieve the particular in-vehicle temperature associated with the economy cooling mode. The instrument panel vents on the driver's side of the vehicle 12 may be used to cool the driver zone DZ chest position CP.

The balanced modes may be configured to provide a reasonably comfortable in-vehicle climate (e.g., more comfortable than the economy mode) in an energy efficiency manner (e.g., although less efficiency than the economy mode). The reasonably comfortable in-vehicle climate may include an air cabin temperature that is selected based on the then-current weather conditions (as detected by the application 15) as well a seat temperature. In the balanced heating mode, the air cabin temperature may be preset to a higher temperature than the preset air cabin temperature that corresponds to the economy heating mode; and in the balanced cooling mode, the air cabin temperature may be preset to a lower temperature than the preset air cabin temperature that corresponds to the economy cooling mode. The balanced mode may also be configured to ensure window visibility (which may include the variables of outside rear view mirror and rear window temperature).

The balanced heating mode may include heating the vehicle interior to the air cabin temperature by causing the driver zone DZ chest position CP, the driver zone DZ feet position FP, the co-driver zone CZ chest position CP, and the co-driver zone CZ feet position FP to be heated. Heating of these zones DZ, CZ and these positions CP, FP may be accomplished by the climate control system 36, using the HVAC system 45, the instrument panel vents on the driver's side and the co-driver's side of the vehicle 12, and the floor vents on the driver's side and the co-driver's side of the vehicle 12.

The balanced heating mode may also include heating the seats A, B. The mode may be set to heat the seat position SP (i.e., the part of the seats A, B that a person sits on) and/or the cushion (back) position BP (i.e., the part of the seats A, B that a person's back comes into contact with). Heating of the seats A, B may be accomplished by individually activating heating elements 44 (shown in FIG. 1) that are integrated into each of the seats A, B.

The balanced heating mode may also include window visibility. Window visibility may be desirable in cold temperatures, when the windows may be covered in frost and/or snow. To achieve window visibility, the left side window position LSWP, the or right side window position RSWP, the windshield position WP, the right side rear view mirror RSM, the left side rear view mirror LSM, and the rear window RW may be heated. The defog or defrost setting for each of these components may be initiated by the climate control system 36.

The balanced cooling mode may include cooling the vehicle interior to the air cabin temperature by causing the driver zone DZ chest position CP and the co-driver zone CDZ chest position CP to be cooled. Cooling of these zones DZ, CZ and this position CP may be accomplished by the climate control system 36, using the HVAC system 45 and the instrument panel vents on the driver's side and the co-driver's side of the vehicle 12.

The balanced cooling mode may also include cooling the seats A, B. The mode may be set to cool the seat position SP and/or the cushion (back) position BP. Cooling of the seats A, B may be accomplished by individually activating cooling elements 46 (shown in FIG. 1) that are integrated into each of the seats A, B.

The high performance modes may be configured to provide maximum in-vehicle comfort (e.g., more comfortable than the economy mode) regardless of energy efficiency. This mode may include several variables, including, for example, cabin air temperature, seat temperature, outside rear view mirror, rear window temperature and/or steering wheel temperature.

The high performance heating mode may include heating the vehicle interior to the air cabin temperature by causing the driver zone DZ chest position CP, the driver zone DZ feet position FP, the co-driver zone CDZ chest position CP, and the co-driver zone CDZ feet position FP to be heated as previously described. In the high performance heating mode, if the vehicle 12 includes two or more rows of back seats, the rear left zone RLZ and/or RBLZ chest position CP, the rear left zone RLZ and/or RBLZ feet position FP, the rear center zone RCZ chest position CP, the rear center zone RCZ feet position FP, the rear right zone RRZ and/or RBRZ chest position, the rear right RRZ and/or RBRZ zone feet position FP may also be heated. The HVAC system 45 and ceiling and/or floor vents positioned throughout the vehicle 12 may be used to achieve the air cabin temperature in the rear portion of the vehicle 12.

The high performance heating mode may also include heating the seats A, B. In the high performance heating mode, if the vehicle 12 includes two or more rows of back seats, the back seats C, D, E, F and/or G may also be heated. The mode may be set to heat the seat position SP and/or the cushion (back) position BP of any of the seats A-G.

The high performance heating mode may also include the same window visibility as previously described for the balanced heating mode.

The high performance heating mode may also include heating the steering wheel. Heating the steering wheel may be accomplished by individually activating heating elements 44 (shown in FIG. 1) that are integrated into the steering wheel.

The high performance cooling mode may cooling heating the vehicle interior to the air cabin temperature by causing the driver zone DZ chest position CP, the driver zone DZ feet position FP, the co-driver zone CDZ chest position CP, and the co-driver zone CDZ feet position FP to be heated as previously described. In the high performance cooling mode, if the vehicle 12 includes two or more rows of back seats, the rear left zone RLZ and/or RBLZ chest position CP, the rear left zone RLZ and/or RBLZ feet position FP, the rear center zone RCZ chest position CP, the rear center zone RCZ feet position FP, the rear right zone RRZ and/or RBRZ chest position, the rear right RRZ and/or RBRZ zone feet position FP may also be cooled. The HVAC system 45 and ceiling and/or floor vents positioned throughout the vehicle 12 may be used to achieve the air cabin temperature in the rear portion of the vehicle 12.

The high performance cooling mode may also include cooling the seats A, B. In the high performance cooling mode, if the vehicle 12 includes two or more rows of back seats, the back seats C, D, E, F and/or G may also be cooled. The mode may be set to cool the seat position SP and/or the cushion (back) position BP of any of the seats A-G.

The high performance cooling mode may also include cooling the steering wheel. Cooling the steering wheel may be accomplished by individually activating cooling elements 44 (shown in FIG. 1) that are integrated into the steering wheel.

The visibility mode provides a maximum level of window visibility while neglecting or partially neglecting in-vehicle comfort to achieve energy efficiency. The visibility only mode achieves window visibility but does not attempt to provide in-vehicle comfort. Other visibility mode may achieve window visibility and some level of in-vehicle comfort (e.g., the previously described balanced heating mode).

The visibility only mode may achieve window visibility as previously described for the balanced heating mode. In short, the visibility only mode includes the following variables and the corresponding zones, and positions: cabin air temperature, which may include heating the windshield zone, including the windshield position WP and the right and left side window positions RSWP, WSWP; outside rear view mirror, which may include heating the left side mirror LSM and the right side mirror RSM, and the rear window temperature, which may include heating the rear window RW.

While several preset climate control modes 72 have been described herein, it is to be understood that other preset modes 72 and or variations of the described preset modes 72 may also be part of the application 15.

As previously mentioned the climate control system 36 of the vehicle 12 may be used to implement the selected preset climate control mode 72. Referring back to FIG. 1, the climate control system 36 of the vehicle 12 includes the control module 42 and any equipment necessary to implement the selected preset climate control mode 72. The climate control system 35 may include the HVAC system 45, heating elements 44 and cooling elements 46 positioned throughout the vehicle 12. The HVAC system 45 may be a single system, or may include separate front and rear systems.

The control module 42 of the climate control system 36 is in communication with the VCP 26 via the vehicle bus 54. The control module 42 is also operatively connected to the HVAC system 45, the heating element(s) 44 and the cooling element(s) 46. The control module 42 is responsive to the VCP 26, and the HVAC 45, the heating element(s) 44, and the cooling element(s) 46 are responsive to the control module 42. The control module 42 is an electronic control unit that is capable of monitoring for instructions from the VCP 26, and of controlling the HVAC system 45, the heating element(s) 44, and the cooling element(s) 46. Generally, the control module 42 recognizes a climate control instruction 74 from the VCP 26, generates a climate control output 78 (shown in FIG. 3) that corresponds with the climate control instruction 74, and transmits the climate control output 78 to the HVAC system 45, the heating element(s) 44 and/or cooling element(s) 46. For example, the control module 42 may transmit signals having different voltages to control one or more components (e.g., initiate the blower mode/speed, engage the air conditioning compressor clutch, etc.) of the HVAC system 45 and/or to control the heating element(s) 44 or the cooling element(s) 46 of the seat(s) A-G and/or the steering wheel. In response, the HVAC system 45, the heating element(s) 44 and/or the cooling element(s) 46 implement the selected preset climate control mode 72.

The control module 42 includes a microprocessor and an electronic memory. The control module 42 also includes computer-readable instructions that are stored on the memory and are executable by the microprocessor. The control module 42 receives the climate control instruction 74 from the VCP 26, and translates the received instruction(s) (or command(s)) into the climate control output 78, which includes a function to be implemented by the HVAC system 45, the heating element(s) 44 and/or cooling element(s) 46. The control module 42 causes the HVAC system 45, the heating element(s) 44 and/or cooling element(s) 46 to perform the function.

As previously mentioned, the HVAC system 45 may use the instrument panel vents, floor vents, ceiling vents, and/or any other vents positioned throughout the vehicle to achieve the cabin air temperature, which may include heating and/or cooling the driver zone DZ, co-driver zone CDZ, the rear left zone RLZ, RBLZ, the rear right zone RRZ, RBRZ, and the windshield zone (which may include the windshield position WP and the right and left side window positions RSWP, LSWP). The components of the HVAC system 45 and the vents that are utilized will depend upon the variable, and in some instances, the zone and position that is/are to be heated or cooled.

The heating element(s) 44 may be any heat source that is dedicated to increasing the temperature of a vehicle component (e.g., seat, steering wheel, etc.) or may be part of the defog/defrost system for the outside rear view mirrors or the rear window. The cooling element(s) 46 may be any cooling source that is dedicated to decreasing the temperature of to vehicle component (e.g., seat, steering wheel, etc.).

Additionally, the climate control system 36 may include a sensor interface 48 and sensor(s) 50 that provide feedback to the climate control system 36. The sensor(s) 50 may sense the cabin air temperature, the seat temperature(s), the outside rear view mirror temperature, the rear window temperature, and/or the steering wheel temperature, and transmit the detected temperature 80 (shown in FIG. 3) to the sensor interface 48.

The sensor interface 48 may generate a current status update 82 (shown in FIG. 3) based on the detected temperature 80 and transmit the current status update 82 to the VCP 26. The sensor interface 48 may generate and transmit the current status update 82 on its own initiative or the sensor interface 48 may generate and transmit the current status update 82 in response to a current status request 84 (shown in FIG. 3) from the VCP 26. If the sensor interface 48 determines that the selected preset climate control mode 72 has been implemented, the sensor interface 48 may generate a completion notification 88 (shown in FIG. 3) and transmit the completion notification 88 to the VCP 26.

The sensor interface 48 may also transmit the detected temperature 80 to the control module 42 so that the control module 42 can determine if the selected preset climate control mode 72 according to the climate control instruction 74 has been implemented. If the control module 42 determines that the selected preset climate control mode 72 has not been implemented, the control module 42 may generate an additional climate control output to cause the selected preset climate control mode 72 to be implemented. The control module 42 may also generate a current status update 82 (shown in FIG. 3) based on the detected temperature 80 and transmit the current status update 82 to the VCP 26. If the control module 42 determines that the selected preset climate control mode 72 has been implemented, the control module 42 may generate an additional climate control output to cause the HVAC system 45, the heating element(s) 44 and/or the cooling element(s) 46 to stop heating or cooling. If the control module 42 determines that the selected preset climate control mode 72 has been implemented, the control module 42 may also generate a completion notification 88 (shown in FIG. 3) and transmit the completion notification 88 to the VCP 26.

As mentioned above, examples of the system 10 include the mobile communications device 14. In the examples disclosed herein, the mobile communications device 14 may be any mobile device, including a smart phone, such as a GSM/LTE phone or a GSM/CDMA/LTE phone. In other examples, the mobile communications device 14 may be any portable device that has a mobile device communication platform (MDCP) 26'. Examples of other mobile communication devices 14 include a wearable device (e.g., smart bracelet, smart watch, helmet, etc.), a tablet computer, a key fob, etc., each of which may be, for example, GPS, cellular/Internet wireless communication enabled, and short range-wireless communication enabled.

As shown in FIG. 1 and mentioned above, the mobile communications device 14 has a communications platform, the MDCP 26', which includes the low energy, short-range wireless communication module 28' or is capable of communicating via another short-range wireless technology. As discussed above, the low energy, short-range wireless communication capability (e.g., BLUETOOTH® LE or Smart, and variations thereof) enables the mobile communications device 14 to communicate with other low energy, short-range wireless communication devices (e.g., the vehicle 12).

The MDCP 26' may also include a cellular adapter 34'. The cellular adapter 34' may include a cellular chipset/component for voice communications and a data transmission unit for data transmission. Using the cellular adapter 34', the mobile communications device 14 is capable of making cellular or satellite connections and/or Internet connections (over the wireless carrier/communication system 24). The cellular adapter 34' of the mobile communications device 14 may also provide a portable hotspot, which taps into the cellular network (e.g., a 4G network) and then wirelessly shares its data connection with another short-range wireless communication enabled (e.g., Wi-Fi enabled) device.

The mobile communications device 14 also includes physical hardware (e.g., a microprocessor 40') and computer readable instructions stored in an electronic memory 38'. The microprocessor 40' of the mobile communications device 14 may be similar to processor 40 of the vehicle 12, and is capable of executing the computer readable instructions stored in the memory 38', which may be similar to the electronic memory 38.

The mobile communications device 14 also includes the user interface 18. The user interface 18 allows a user to input information and commands to the mobile communications device 14 and receive information from the mobile communications device 14. The user interface 18 may be any command-driven user interface or any menu-driven interface. In an example, the user interface 18 is a graphical user interface (GUI). In another example, the user interface 18 is a human machine interface (HMI). As shown in FIG. 1, the user interface 18 may include a display 19. The user interface 18 may also include a microphone, a speaker, a touchscreen, and/or a keypad.

In an example, the display 19 is a full-color touch screen display. Other examples of the display 19 include a VFD (Vacuum Fluorescent Display), an LED (Light Emitting Diode) display, an LCD (Liquid Crystal Diode) display, and/or the like.

The user interface 18 may assist the MDCP 26' with a variety of services. One example of these services includes the user interface 18 allowing a user to enter a user input identifying the selected preset climate control mode 72. The user may speak a verbal command or series of verbal commands, select a menu option or an icon, or type a word or phrase. The user interface 18 may collect and send data associated with the verbal command(s), menu option(s), icon(s), or word(s) to the MDCP 26'. The MDCP 26' may recognize the data as the selected preset climate control mode 72 and send the selected preset climate control mode 72 to the VCP 26.

Another example of a service the user interface 18 assists in providing is displaying (e.g., on display 19) a visual representation of the selected preset climate control mode 72 in response to receiving the user input identifying the selected preset climate control mode 72. The visual representation may be an icon or a word. For example, the visual representation of the economy mode may be an icon of a leaf. The visual representation of the economy heating mode may be an icon of a leaf and an icon of a fire. The visual representation of the economy cooling mode may be an icon of a leaf and an icon of an icicle or a snowflake. The user interface 18 may also display (e.g., on display 19) a visual representation of the confirmation of the implementation 90 (shown in FIG. 3) of the selected preset climate control mode 72, a visual representation of the current status update 82, a visual representation of the completion notification 88, a visual representation of a weather alert 92 (shown in FIG. 3), and/or a visual representation of a driving advisory 94 (shown in FIG. 3).

In the system 10, the vehicle 12 and/or the mobile communications device 14 may be in communication with the server 22, which may be part of a center 68 that provides back-end services to the vehicle 12. As an example, the server 22 may host the computing device (including model 16 and controller 20), may communicate with the mobile communications device 14 to receive the user input data 76, and may communicate with the vehicle 12 to transmit the selected preset climate control mode 72 thereto.

It is to be understood that the center 68 shown in FIG. 1 may be any central or remote facility, manned or unmanned, mobile or fixed, to or from which it is desirable to exchange voice and data communications.

The center 68 shown in FIG. 1 may also be virtualized and configured in a Cloud Computer, that is, in an Internet-based computing environment. For example, the server 22 (and other computing equipment) may be accessed as a Cloud platform service, or PaaS (Platform as a Service), utilizing Cloud infrastructure rather than hosting server 22 at the center 68. In these instances, the server 22 (and other center 68 components) may be virtualized as a Cloud resource. The Cloud infrastructure, known as IaaS (Infrastructure as a Service), typically utilizes a platform virtualization environment as a service, which may include components such as processor(s) 40", server 22, and other computer equipment. In an example, the real-time services performed by the server 22 disclosed herein may be performed in the Cloud via the SaaS (Software as a Service).

As shown in FIG. 1, the server 22 includes the processor 40". The processor 40" may be a controller, a host processor (e.g., for the computing device), an ASIC, or a processor working in conjunction with a central processing unit (CPU). The processor 40" is capable of executing the computer readable instructions that are stored on the electronic memory 38".

The server 22 also includes a server communication transceiver 30" that may be in selective communication with the VCP 26 and/or the MDCP 26'. The server communication transceiver 30" may be any suitable data transmission system that is capable of sending and/or receiving data communications over the carrier/communication system 24. For example, the server communication transceiver 30" is capable of receiving the user input data 76 from the mobile communications device 14. The server communication transceiver 30" can also transmit the selected preset climate control mode 72 to the VCP 26 of the vehicle 12. The server 22, hosting the computing device, may reference a list of user inputs and the preset climate control modes associated with the user inputs (stored in the memory 38") to authenticate the user input data 76.

As illustrated in FIG. 1, the various center components may be coupled to one another via a network connection or bus 54', such as one similar to the vehicle bus 54 previously described.

In addition to the server 22, the center 68 may also include other components, such as additional processor(s) (not shown) and/or switch(es) 70. In some instances, the center 68 may also include advisor(s) (not shown). The additional processor(s), which may be used in conjunction with telecommunication and computer equipment (not shown), may generally be equipped with suitable software and/or programs enabling the processor(s) to accomplish a variety of center functions or tasks. The telecommunication and computer equipment (including computers) may include a network of servers (including server 22) coupled to both locally stored and remote databases of any information processed. The switch(es) 70 may be private branch exchange (PBX) switch(es). The switch 70 routes incoming signals so that voice transmissions are usually sent to either a live advisor or an automated response system, and data transmissions are passed on to a modem or other piece of equipment (e.g., a communications module) for demodulation and further signal processing. User input data 76 from the mobile communications device 14 may be transmitted to the server 22.

Different components of the system 10 may be used to perform different examples of the method for heating or cooling the vehicle 12. The short-range wireless communications and/or Internet communications as previously described are utilized in the example of the method 100 shown in FIG. 3. Throughout the discussion of the method 100, it is to be understood that the communications platforms 26, 26' may communicate with one another, and that the computing device (including model 16 and controller 20) may be implemented in the mobile communications device 14 or the server 22.

Figure 3:
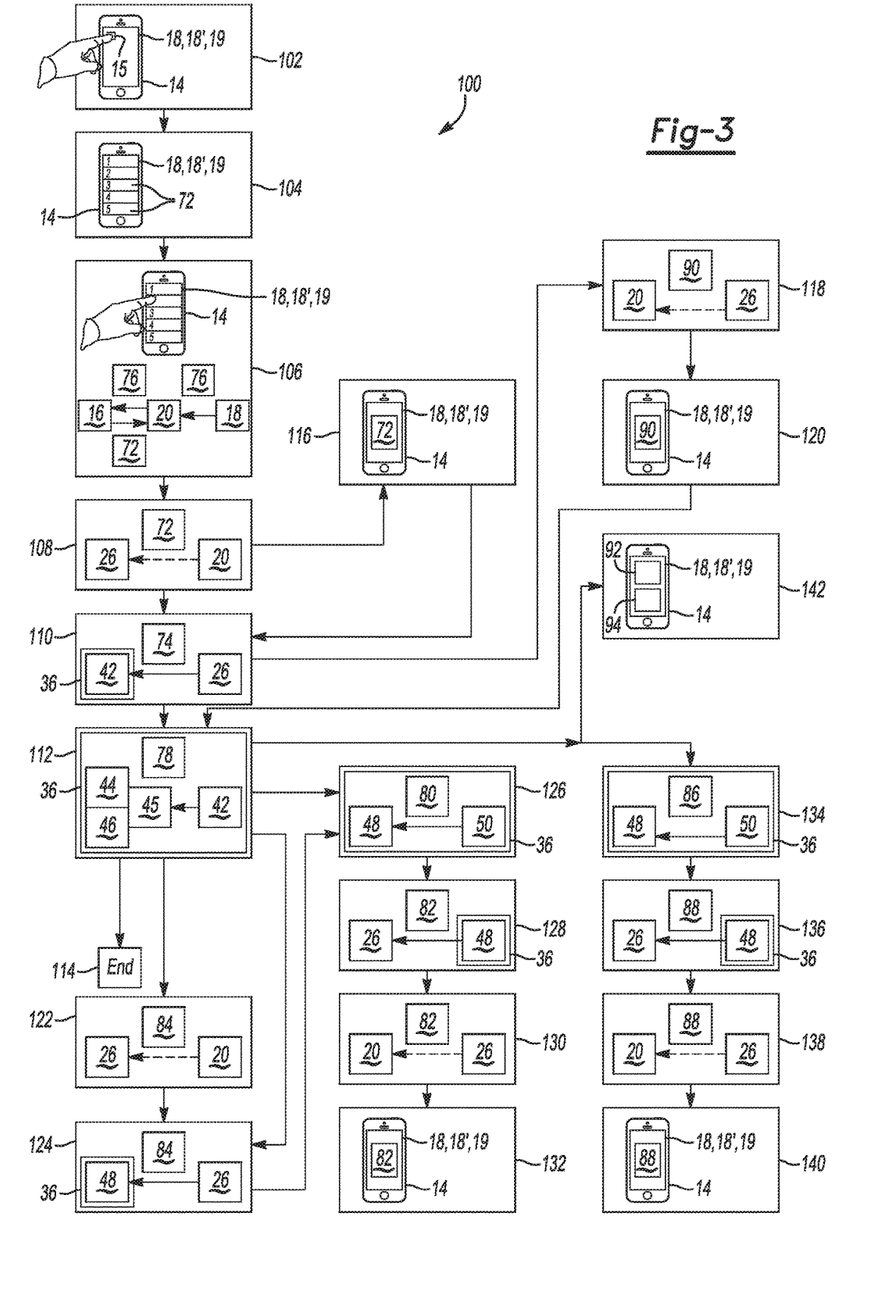
FIG. 3 is a flow diagram illustrating an example of a method for heating or cooling a vehicle.

As shown at reference numeral 102 of FIG. 3, the method 100 includes launching the application 15 on the mobile communications device 14 (in this example, a smart phone). The user may launch the view 18' of the vehicle heating/cooling application 15. It is to be understood that the user may launch the view 18' from any location and does not need to be near the vehicle 12 to do so.

Once the application 15 has been launched, preset climate control modes 72 are displayed on the view 18' (e.g., on display 19). In the example shown in FIG. 3 at reference numeral 104, the preset climate control modes 72 are displayed in the form of a list (shown as 1-5 in FIG. 3) that may be scrolled through. In another example, each preset climate control mode 72 may be shown on the full screen of the display 19, and the user may search through the preset climate control modes 72 by swiping the screen left or right. In other examples, the preset climate control modes 72 may be searchable. For example, the user may type the name of a preset climate control mode 72 into a search bar to bring up relevant preset climate control modes. In still other examples, recently used or weather appropriate preset climate control modes 72 may be displayed first.

As shown at reference numeral 106, a user input is received at the view 18' (e.g., user interface 18) of the mobile communications device 14. As mentioned above, the user may enter the user input by speaking verbal command(s), selecting menu option(s) or icon(s), or typing word(s).

While not shown in FIG. 3, in some examples, prior to entering the user input to identify the selected preset climate control mode 72, the user may first be required to enter an authentication. Once the authentication is recognized by the view 18', the user input identifying the selected preset climate control mode 72 may entered. In other examples, the user input identifying the selected preset climate control mode 72 may entered without first requiring the user to enter an authentication.

Upon receiving the user input data 76, the view 18' sends the user input data 76 to the controller 20 (which, as described above, may be part of the mobile communications device 14 or the server 22). The controller 20 identifies the user input data 76, e.g., in a list of sets of user input data and identifies the preset climate control mode associated with that user input data 76. The preset climate control mode associated with that user input data 76 is the selected preset climate control mode 72. The controller 20 is programmed to utilize the received user input data 76 as a query in the library or data table of the model 16 to determine whether the user input data 76 is present in the library or data table (i.e., is associated with a preset climate control mode 72). When the model 16 is present on the server 22, the library or data table may have more stored preset climate control modes than when the model 16 is present on the mobile communications device 14.

When the user input data 76 is not present in the list of sets of user input data associated with preset climate control modes, the controller 20 can transmit a message for display on the view 18' indicating that the user input does not correspond to a preset climate control mode and/or prompting the user to reenter the user input. The identification of the preset climate control mode (i.e., the selected preset climate control mode 72) associated with the user input data 76 is shown at reference numeral 106.

Once the selected preset climate control mode 72 is identified, the controller 20 transmits the selected preset climate control mode 72 to the VCP 26. This transmission indicates to the VCP 26 that the vehicle 12 should be remotely started via the remote start system 35 and that the preset climate control mode 72, having been identified by the controller 20 as being associated with the user input data 76, should be implemented in the vehicle 12. The transmission of the selected preset climate control mode 72 to the VCP 26 is shown at reference numeral 108.

In some examples of the method 100, in addition to transmitting the selected preset climate control mode 72 to the VCP 26, the controller 20 causes the view 18' (e.g., display 19) to display a visual representation of the selected preset climate control mode 72 upon identifying the selected preset climate control mode 72. The visual representation of may an icon(s) or a word(s). Displaying the visual representation of the selected preset climate control mode 72 indicates to the user which preset climate control mode 72 has been identified by the controller 20 as corresponding with the user input data 76. Displaying the visual representation of the selected preset climate control mode 72 is shown at reference numeral 116.

In other examples of the method 100, the controller 20 does not cause the view 18' to display a visual representation of the selected preset climate control mode 72. In these examples, the method 100 proceeds from reference numeral 108 to reference numeral 110.

After the vehicle 12 is started and the appropriate in-vehicle systems are started in response to receiving the selected preset climate control mode 72, the VCP 26 transmits the climate control instruction 74 to the control module 42 of the climate control system 36. Based upon the identified selected preset climate control mode 72, the VCP 26 determines, generates, and transmits the appropriate climate control instruction 74. The climate control instruction 74 indicates to the control module 42 which preset climate control mode 72 is to be initiated/implemented. The transmission of the climate control instruction 74 to the control module 42 is shown at reference numeral 110.

In some examples, upon transmitting the climate control instruction 74 to the control module 42, the VCP 26 generates and transmits confirmation of the implementation 90 of the selected preset climate control mode 72 to the controller 20 (e.g. MDCP 26'). The confirmation of the implementation 90 indicates to the controller 20 that the selected preset climate control mode 72 has been received by the VCP 26 and that the implementation of the selected preset climate control mode 72 has been initiated in the vehicle 12. The transmission of the confirmation of the implementation 90 to the controller 20 is shown at reference numeral 118.

When the VCP 26 transmits the confirmation of the implementation 90 to the controller 20, the mobile communications device 14 (directed by the controller 20) may display on the view 18' (e.g., display 19) a visual representation of the confirmation of the implementation 90. The visual representation of the confirmation of the implementation 90 may an icon(s) or a word(s). Displaying the visual representation of the confirmation of the implementation 90 indicates to the user that the selected preset climate control mode 72 has been received by the vehicle 12 and that the implementation of the selected preset climate control mode 72 has been initiated. Displaying the visual representation of the confirmation of the implementation 90 is shown at reference numeral 120.

In other examples of the method 100, the VCP 26 does not transmit the confirmation of the implementation 90 to the controller 20 and the mobile communications device 14 does not display a visual representation of the confirmation of the implementation 90. In these examples, the method 100 proceeds from reference numeral 110 to reference numeral 112.

As shown at reference numeral 112, the control module 42 causes the selected preset climate control mode 72 to be implemented in the vehicle 12. Upon receiving the climate control instruction 74, the control module 42 generates an appropriate climate control output 78 that will achieve the selected preset climate control mode 72. The climate control output 78 indicates to the in-vehicle systems (e.g., the HVAC system 45, the heating element(s) 44 and/or the cooling element(s) 46) an action or function that is to be performed in order to implement the selected preset climate control mode 72 received by the VCP 26 and the associated climate control instruction 74 received by the control module 42. The control module 42 transmits the climate control output 78 to the HVAC system 45, the heating element(s) 44 and/or the cooling element(s) 46, and the HVAC system 45, the heating element(s) 44 and/or the cooling element(s) 46 are responsive to the climate control output 78. The appropriate in-vehicle system(s) (HVAC system 45, heating element(s) 44 and/or cooling element(s) 46) performs the action or function in order to implement the preset climate control mode 72. The causing of the selected preset climate control mode 72 to be implemented in the vehicle 12 is shown at reference numeral 112.

Implementation of the selected preset climate control mode 72 may be accomplished by causing the driver zone DZ chest position CP and/or feet position FP, the co-driver zone CDZ chest position CP and/or feet position FP, the rear left zone RLZ, RBLZ chest position CP and/or feet position FP, the rear right zone RRZ, RBRZ chest position CP and/or feet position FP, and/or the rear center zone RCZ chest position CP and/or feet position FP to be heated or cooled. The implementation of the selected preset climate control mode 72 may also or alternatively be accomplished by heating or cooling any of the seat positions SP and/or cushion (back) positions BP of the seats A-G and/or the steering wheel. Implementation of the selected preset climate control mode 72 may also or alternatively be accomplished by causing any of the following: the outside right and/or left side rear view mirrors RSM, LSM to heat; the windshield zone (including the windshield position and the side window positions LSWP, RSWP) to heat (e.g., defog or defrost); and/or the rear window RW to heat. Implementation of the selected preset climate control mode 72 may also or alternatively be accomplished by causing the windshield zone (including the windshield position and the side window positions LSWP, RSWP) to defog and/or the rear window RW to defog by directing dry air at the windshield zone and/or the rear window RW. The dry air may be any temperature. In any of the examples disclosed herein, windows adjacent to rear seats may be defogged or defrosted.

The selected preset climate control mode 72 may be any preset climate control mode and may correspond to the heating or cooling of any of the above listed zones and/or positions. Some examples of the possible selected preset climate control modes 72 include the economy heating mode, the economy cooling mode, the balanced heating mode, the balanced cooling mode, the high performance heating mode, the high performance cooling mode, and the visibility (only) mode.

After the control module 42 causes the selected preset climate control mode 72 to be implemented, several variations of the method 100 may take place. In one example, as shown at reference numeral 114, the method 100 may end after reference numeral 112. In another example, the method 100 may involve sensing a current status, generating and transmitting a current status update 82, and displaying a visual representation of the current status update 82 (e.g., reference numerals 126-132). In still another example, the method 100 may involve transmitting a current status request 84 prior to sensing a current status, generating and transmitting a current status update 82, and displaying a visual representation of the current status update 82 (e.g., reference numerals 122-132 or reference numerals 124-132). In still another example, the method 100 may involve sensing a completion of the implementation 86, generating and transmitting a completion notification 88, and displaying a visual representation of the completion notification 88 (e.g., reference numerals 134-140). In still another example, the method 100 may involve displaying a visual representation of a weather alert 92, a driving advisory 94, or both the weather alert 92 and the driving advisory 94. Each of these examples of the method 100 will be described in more detail below.

In an example, after the control module 42 causes the selected preset climate control mode 72 to be implemented by the various in-vehicle systems, the sensor 50 may sense a current status of the implementation of the selected preset climate control mode 72. The sensor 50 may transmit the sensed current status to the sensor interface 48. In the example shown at reference numeral 126, the current status of the implementation of the selected preset climate control mode 72 is in the form of a detected temperature 80. Different sensors 50 may sense the cabin air temperature, the seat temperature(s), the outside rear view mirror temperature, the rear window temperature, and/or the steering wheel temperature. The temperature(s) 80 detected by the sensor(s) 50 may be transmitted to the sensor interface 48, which can determine whether the temperature is suitable for the mode 72 being implemented. In another example (not shown), the current status may be the amount of visibility through a window. In still another example (not shown), the current status may be determined by the amount of time that has passed since causing the implementation of the selected preset climate control mode 72. The amount of time before the implementation of the selected preset climate control mode 72 is considered to be complete may depend on the preset mode 72 and/or the model of the vehicle 12. In an example, the current status indicates that the implementation of the selected preset climate control mode 72 is incomplete. For example, the sensor data may indicate that the seat temperature and the in-vehicle temperature has not yet reached a minimum temperature associated with the balanced heating mode.

Once the current status is received at the sensor interface 48, the sensor interface 48 may generate the appropriate current status update 82 based on the current status (e.g., detected temperature(s) 80) and transmit the current status update 82 to the VCP 26. In another example (not shown), the sensor interface 48 may transmit the current status to the control module 42, and the control module 42 may generate the appropriate current status update 82 based on the current status and transmit the current status update 82 to the VCP 26. The current status update 82 indicates to the VCP 26 the current status of the implementation of the selected preset climate control mode 72 in the vehicle 12. In an example, the current status update 82 indicates that the implementation of the selected preset climate control mode 72 is incomplete. The generation and transmission of the current status update 82 by the sensor interface 48 is shown at reference numeral 128.

Once the current status update 82 is received at the VCP 26, the VCP 26 may transmit the current status update 82 to the controller 20 (e.g., MDCP 26'). The current status update 82 indicates to the controller 20 the current status of the implementation of the selected preset climate control mode 72 in the vehicle 12. The transmission of the current status update 82 to the controller 20 is shown at reference numeral 130.

When the VCP 26 transmits the current status update 82 to the controller 20, the mobile communications device 14 (directed by the controller 20) may display on the view 18' (e.g., display 19) a visual representation of the current status update 82. The visual representation of the current status update 82 may an icon(s) or a word(s). Displaying the visual representation of the current status update 82 indicates to the user the current status of the implementation of the selected preset climate control mode 72 in the vehicle 12. Displaying the visual representation of the current status update 82 is shown at reference numeral 132.

In some examples, sensor interface 48 or the control module 42 may generate and transmit the current status update 82 on its own initiative. In these examples, the method 100 proceeds directly from reference numeral 112 to reference numeral 126.

In other examples, the sensor interface 48 or the control module 42 may generate and transmit the current status update 82 in response to a current status request 84 from the VCP 26. The current status request 84 may be generated by the VCP 26 or may be received by the VCP 26 from the controller 20. In these examples where the current status update 82 is generated in response to a current status request 84, the method 100 proceeds from reference numeral 112 to reference numeral 122 or to reference numeral 124.

As shown at reference numeral 122, the controller 20 (e.g. MDCP 26') may generate and transmit the current status request 84 to the VCP 26. The controller 20 may generate and transmit the current status request 84 after a determined amount of time has passed (since implementation of the mode 72 began) or another trigger is detected by the controller 20. The current status request 84 indicates to the VCP 26 that the controller 20 would like to receive the current status update 82.

Once the current status request 84 is received at the VCP 26, the VCP 26 may transmit the current status request 84 to the sensor interface 48 or to the control module 42. The current status request 84 indicates to the sensor interface 48 or to the control module 42 that the VCP 26 would like to receive the current status update 82. The transmission of the current status request 84 to the sensor interface 48 is shown at reference numeral 124.

In an example, the VCP 26 may generate and transmit the current status request 84 without receiving a current status request 84 from the controller 20. The VCP 26 may generate and transmit the current status request 84 after a determined amount of time has passed (since implementation of the mode 72 began) or another trigger is detected by the VCP 26. In this example, the method 100 proceeds directly from reference numeral 112 to reference numeral 124.

In still another example, the sensor 50 may sense a completion of the implementation 86 of the selected preset climate control mode 72. The completion of the implementation 86 may be a temperature (e.g., in-vehicle temperature, seat temperature, etc.) that corresponds with the temperature(s) of the particular mode 72 being implemented. When the reading of the sensor 50 matches the mode 72, then the sensor 50 may transmit the sensed completion of the implementation 86 to the sensor interface 48. The completion of the implementation 86 indicates that the implementation of the selected preset climate control mode 72 is complete. The sensing and transmission of the completion of the implementation 86 is shown at reference numeral 134.

Once the completion of the implementation 86 is received at the sensor interface 48, the sensor interface 48 may generate a completion notification 88 and transmit the completion notification 88 to the VCP 26. In another example (not shown), the sensor interface 48 may transmit the completion of the implementation 86 to the control module 42, and the control module 42 may generate a completion notification 88 and transmit the completion notification 88 to the VCP 26. The completion notification 88 indicates to the VCP 26 that the implementation of the selected preset climate control mode 72 is complete in the vehicle 12. The generation and transmission of the completion notification 88 is shown at reference numeral 136.

Once the completion notification 88 is received at the VCP 26, the VCP 26 may transmit the completion notification 88 to the controller 20 (e.g. MDCP 26'). The completion notification 88 indicates to the controller 20 that the implementation of the selected preset climate control mode 72 is complete in the vehicle 12. The transmission of the completion notification 88 to the controller 20 is shown at reference numeral 138.

When the VCP 26 transmits the completion notification 88 to the controller 20, the mobile communications device 14 (directed by the controller 20) may display on the view 18' (e.g., display 19) a visual representation of the completion notification 88. The visual representation of the completion notification 88 may an icon(s) or a word(s). Displaying the visual representation of the completion notification 88 indicates to the user that the implementation of the selected preset climate control mode 72 is complete in the vehicle 12. Displaying the visual representation of the completion notification 88 is shown at reference numeral 140.

In still another example, the mobile communications device 14 (directed by the controller 20) may display on the view 18' (e.g., display 19) a visual representation of a weather alert 92, a driving advisory 94, or both the weather alert 92 and the driving advisory 94. In the example shown at reference numeral 142, both the weather alert 92 and the driving advisory 94 are displayed. The visual representation of the weather alert 92 and/or the driving advisory 94 may an icon(s) or a word(s). Displaying the visual representation of the weather alert 92 indicates to the user a current weather condition in the area of the vehicle 12. Displaying the visual representation of the driving advisory 94 provides the user with a hint or advice for driving in the current driving conditions in the area of the vehicle 12. This information may be received by the application 15 from a third party (such as a local weather authority and/or traffic authority).

In one example, the computing device is implemented on the mobile communications device 14. In this example, the vehicle heating and cooling application 15 is stored on the electronic memory 38' of the mobile communications device 14, and the microprocessor 40' of the mobile communications device 14, which is coupled to the electronic memory 38', acts as the controller 20. The model 16 of vehicle heating and cooling application 15 is stored on the electronic memory 38' and includes a list of a plurality of sets of user input data 76, each set of user input data 76 being associated with a preset climate control mode. The microprocessor 40' is programmed to identify the preset climate control mode (i.e. the selected preset climate control mode 72) associated with the user input data 76. Once the microprocessor 40' identifies the selected preset climate control mode 72, the MDCP 26' transmits the selected preset climate control mode 72 to the VCP 26, which initiates the remote start of the vehicle 12 and generates and transmits appropriate the climate control instruction 74 to the control module 42 of the climate control system 36.

In another example, the computing device is implemented on the server 22. In this example, the vehicle heating and cooling application 15 is stored on the electronic memory 38" of the server 22 and the processor 40" of the server 22, which is coupled to the electronic memory 38", acts as the controller 20. The model 16 of the vehicle heating and cooling application 15 is stored on the electronic memory 38" and includes a list of a plurality of sets of user input data 76, each set of user input data 76 being associated with a preset climate control mode. The view 18', implemented on the mobile communications device 14, transmits the user input data 76 to the processor 40". The processor 40" is programmed to identify the preset climate control mode (i.e. the selected preset climate control mode 72) associated with the user input data 76. Once the processor 40" identifies the selected preset climate control mode 72, the server 22 transmits the selected preset climate control mode 72 to the VCP 26, which initiates the remote start of the vehicle 12 and generates and transmits appropriate climate control instruction 74 to the control module 42 of the climate control system 36.

Whether the computing device is implemented on the mobile communications device 14 or the server 22, the method 100 disclosed herein may be repeated when the vehicle heating and cooling application 15 launches, preset climate control modes are displayed, and the user enters a user input identifying the selected preset climate control mode 72. The user may use the method 100 to implement any preset climate control mode. The user may also use the method 100 to change which preset climate control mode is to be implemented prior to the completion of a previous implementation of a preset climate control mode.

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic described) in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A method for heating or cooling a vehicle, the method comprising:
    launching an application resident on an electronic memory of a mobile communications device, the electronic memory of the mobile communication device coupled to a microprocessor of the mobile communications device, and the microprocessor of the mobile communications device operatively connected to a mobile device communications platform;
    displaying, on a display of the mobile communications device, preset climate control modes;
    receiving, at a user interface of the mobile communications device, a user input identifying a selected preset climate control mode;
    in response to receiving the user input, transmitting the selected preset climate control mode to a vehicle communications platform of the vehicle;
    in response to receiving the selected preset climate control mode at the vehicle communications platform, transmitting, by the vehicle communications platform, a climate control instruction to a climate control system of the vehicle, the climate control system having a control module in communication with the vehicle communications platform; and
    in response to receiving the climate control instruction at the control module of the climate control system, causing the selected preset climate control mode to be implemented in the vehicle.

2. The method as defined in claim 1 wherein the selected preset climate control mode is an economy heating mode and the causing of the selected preset climate control mode to be implemented is accomplished by causing a driver zone chest position and a driver zone feet position to be heated.

3. The method as defined in claim 1 wherein the selected preset climate control mode is an economy cooling mode and the causing of the selected preset climate control mode to be implemented is accomplished by causing a driver zone chest position to be cooled.

4. The method as defined in claim 1 wherein the selected preset climate control mode is a balanced heating mode and the causing of the selected preset climate control mode to be implemented is accomplished by causing a driver zone chest position, a driver zone feet position, a left side window position, a co-driver zone chest position, a co-driver zone feet position, a right side window position, a windshield position, a driver seat position, a driver cushion position, a co-driver seat position, a co-driver cushion position, an outside rear view mirror left side position, an outside rear view mirror right side position, and a rear window position to be heated.

5. The method as defined in claim 1 wherein the selected preset climate control mode is a balance cooling mode and the causing of the selected preset climate control mode to be implemented is accomplished by causing a driver zone chest position, a co-driver zone chest position, a driver seat position, a driver cushion position, a co-driver seat position, and a co-driver cushion position to be cooled.

6. The method as defined in claim 1 wherein the selected preset climate control mode is a high performance heating mode and the causing of the selected preset climate control mode to be implemented is accomplished by causing a driver zone chest position, a driver zone feet position, a left side window position, a co-driver zone chest position, a co-driver zone feet position, a right side window position, a windshield position, a driver seat position, a driver cushion position, a co-driver seat position, a co-driver cushion position, an outside rear view mirror left side position, an outside rear view mirror right side position, a rear window position, and a steering wheel position to be heated.

7. The method as defined in claim 6 wherein the vehicle includes a rear seat and the causing of the selected preset climate control mode to be implemented is accomplished by further causing a rear left zone chest position, a rear left zone feet position, a rear left zone side window position, a rear right zone chest position, a rear right zone feet position, a rear right zone side window position, a rear left seat position, a rear left cushion position, a rear right seat position, and a rear right cushion position to be heated.

8. The method as defined in claim 1 wherein the selected preset climate control mode is a high performance cooling mode and the causing of the selected preset climate control mode to be implemented is accomplished by causing a driver zone chest position, a driver zone feet position, a co-driver zone chest position, a co-driver zone feet position, a driver seat position, a driver cushion position, a co-driver seat position, a co-driver cushion position, and a steering wheel position to be cooled.

9. The method as defined in claim 8 wherein the vehicle includes a rear seat and the causing of the selected preset climate control mode to be implemented is accomplished by further causing a rear left zone chest position, a rear left zone feet position, a rear right zone chest position, and a rear right zone feet position to be cooled.

10. The method as defined in claim 1 wherein the selected preset climate control mode is a visibility mode and the causing of the selected preset climate control mode to be implemented is accomplished by causing a left side window position and a right side window position, a windshield position, an outside rear view mirror left side position, an outside rear view mirror right side position, and a rear window position to be heated.

11. The method as defined in claim 1, further comprising displaying, on the display of the mobile communications device, a visual representation of the selected preset climate control mode in response to receiving the user input identifying the selected preset climate control mode, wherein the visual representation is an icon or a word.

12. The method as defined in claim 1, further comprising:
in response to transmitting the climate control instruction to the control module, transmitting a confirmation of an implementation of the selected preset climate control mode to the mobile device communications platform; and
in response to receiving the confirmation of the implementation of the selected preset climate control mode at the mobile device communications platform, displaying, on the display of the mobile communications device, a visual representation of the confirmation of the implementation of the selected preset climate control mode.

13. The method as defined in claim 1, further comprising:
sensing, by a sensor of the vehicle, a current status of the implementation of the selected preset climate control mode, the sensor connected to a sensor interface, the sensor interface connected to a vehicle bus, and the vehicle bus in communication with the vehicle communications platform;
generating, by either the sensor interface or the control module, a current status update;
transmitting, by either the sensor interface or the control module, the current status update to the vehicle communications platform;
in response to receiving the current status update at the vehicle communications platform, transmitting the current status update to the mobile device communications platform; and
in response to receiving the current status update at the mobile device communications platform, displaying a visual representation of the current status update on the display of the mobile communications device.

14. The method as defined in claim 13 wherein prior to sensing by the sensor, the method further comprises:
transmitting a current status request to the vehicle communications platform;
in response to receiving the current status request at the vehicle communications platform, transmitting, by the vehicle communications platform, the current status request to the sensor interface; and
receiving, at the sensor interface, the current status request.

15. The method as defined in claim 13 wherein the current status of the implementation of the selected preset climate control mode and the current status update indicate that the implementation of the selected preset climate control mode is incomplete.

16. The method as defined in claim 1, further comprising:
sensing, by a sensor of the vehicle, a completion of the implementation of the selected preset climate control mode;
generating, by either the sensor interface or the control module, a completion notification;

transmitting, by either the sensor interface or the control module, the completion notification to the vehicle communications platform;

in response to receiving the completion notification at the vehicle communications platform, transmitting the completion notification to the mobile device communications platform; and in response to receiving the completion notification at the mobile device communications platform, displaying a visual representation of the completion notification on the display of the mobile communications device.

17. The method as defined in claim 1, further comprising displaying, on the display of the mobile communications device, a visual representation of a weather alert, a driving advisory, or both the weather alert and the driving advisory.

18. The method as defined in claim 1 wherein each of the preset climate control modes includes:
a variable selected from the group consisting of cabin air temperature, seat temperature, outside rear view mirror, rear window temperature, steering wheel temperature, and combinations thereof; and
a setting associated with the variable, the setting selected from the group consisting of cooling and heating.

19. The method as defined in claim 18 wherein the variable is the cabin air temperature, the seat temperature, the outside rear view mirror, or combinations thereof, and wherein each of the preset climate control modes further includes a zone selected from the group consisting of a driver zone, a co-driver zone, a rear left zone, a rear right zone, a windshield zone, a driver seat, a co-driver seat, a rear left seat, a rear right seat, a left side outside rear view mirror, a right side outside rear view mirror, and combinations thereof.

20. The method as defined in claim 19 wherein the variable is the cabin air temperature, the seat temperature, or combinations thereof, and wherein each of the preset climate control modes further includes a position selected from the group consisting of a feet position, a chest position, a windshield position, a right side window position, a left side window position, a seat position, a cushion position, and combinations thereof.

21. A system for heating or cooling a vehicle, the system comprising:
an application resident on an electronic memory of a mobile communications device, the electronic memory of the mobile communication device coupled to a microprocessor of the mobile communications device, and the microprocessor of the mobile communications device operatively connected to a mobile device communications platform, the application for:
displaying preset climate control modes;
receiving a user input identifying a selected preset climate control mode; and
transmitting, by using the mobile device communications platform, the selected preset climate control mode to a vehicle communications platform of the vehicle;
the vehicle communications platform operatively disposed in the vehicle, the vehicle communications platform to:
receive the selected preset climate control mode; and
transmit a climate control instruction to a climate control system of the vehicle; and
the climate control system having a control module in communication with the vehicle communications platform, the control module for:
receiving the climate control instruction; and
causing the selected preset climate control mode to be implemented in the vehicle.

* * * * *